(12) United States Patent
Lewis et al.

(10) Patent No.: US 6,615,176 B2
(45) Date of Patent: Sep. 2, 2003

(54) SPEECH ENABLING LABELESS CONTROLS IN AN EXISTING GRAPHICAL USER INTERFACE

(75) Inventors: James R. Lewis, Delray Beach, FL (US); Linda M. Boyer, Boca Raton, FL (US); Ji Whee Tan, West Palm Beach, FL (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/352,731

(22) Filed: Jul. 13, 1999

(65) Prior Publication Data

US 2003/0125956 A1 Jul. 3, 2003

(51) Int. Cl.⁷ .............................. G10L 15/22
(52) U.S. Cl. ................. 704/275; 704/270; 704/272; 704/271
(58) Field of Search ................. 704/270, 271, 704/272, 275

(56) References Cited

U.S. PATENT DOCUMENTS

| | | | | |
|---|---|---|---|---|
| 4,677,569 A | * | 6/1987 | Nakano et al. | 704/275 |
| 5,818,423 A | * | 10/1998 | Pugliese et al. | 345/157 |
| 5,819,225 A | * | 10/1998 | Eastwood et al. | 704/275 |
| 5,864,819 A | * | 1/1999 | Armas et al. | 704/275 |
| 5,873,064 A | * | 2/1999 | Armas et al. | 704/275 |
| 5,884,265 A | * | 3/1999 | Squitteri et al. | 704/275 |
| 5,893,063 A | * | 4/1999 | Loats et al. | 704/275 |
| 5,897,618 A | * | 4/1999 | Loats et al. | 704/275 |
| 5,909,667 A | * | 6/1999 | Leontiades et al. | 704/275 |
| 5,920,841 A | * | 7/1999 | Schottmuller et al. | 704/275 |
| 5,933,807 A | * | 8/1999 | Fukuzawa | 704/275 |
| 5,974,384 A | * | 10/1999 | Yasuda | 704/275 |
| 6,075,534 A | * | 6/2000 | VanBuskirk et al. | 345/348 |
| 6,085,159 A | * | 7/2000 | Ortega et al. | 704/235 |
| 6,161,126 A | * | 12/2000 | Wies et al. | 709/203 |
| 6,182,046 B1 | * | 1/2001 | Ortega et al. | 704/275 |
| 6,199,043 B1 | * | 3/2001 | Happ | 704/272 |

OTHER PUBLICATIONS

Rob Sinclair, Microsoft Active Accessibility:Architecture, Microsoft, May 2000.*
Schmandt et al.; Augmanting a Window System with Speech Input; vol. 23, No. 8, pp. 50–60, Aug. 1990.*
http://www.conversa.com/Web.asp?CaID=2&SuId=2.

* cited by examiner

Primary Examiner—Tālivaldis Ivars Šmits
Assistant Examiner—Abul K. Azad
(74) Attorney, Agent, or Firm—Akerman Senterfitt

(57) ABSTRACT

A method for speech enabling labeless controls in an existing graphical user interface can comprise the steps of: identifying controls in a window contained in the graphical user interface; testing each identified control for an associated label; for each identified control having an associated label, adding the associated label to an active grammar of a speech recognition system; for each identified control not having an associated label, creating a label based upon an object property of a contextually relevant user interface object; and, further adding each created label to the active grammar. In testing each identified control for an associated label, an accessibility interface query can be applied to each identified control in the window. In addition, in creating the label, each contextually relevant object can be searched for an object property descriptive of the identified control not having an associated label. Subsequently, a label can be formed based upon the descriptive object property found in the searching step.

10 Claims, 4 Drawing Sheets

SPEECH ENABLING LABELESS CONTROLS IN AN EXISTING GRAPHICAL USER INTERFACE

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to the field of computer speech navigation and more particularly to a method and apparatus for speech enabling labeless controls in an existing graphical user interface.

2. Description of the Related Art

Speech recognition, also referred to as speech-to-text, is technology that enables a computer to transcribe spoken words into computer recognized text equivalents. Speech recognition is the process of converting an acoustic signal, captured by a transducive element, such as a microphone or a telephone, to a set of words. Subsequently, these words can be used for speech navigation and speech dictation. Though the use of speech recognition for speech dictation has flourished, the transparent application of speech navigation to a graphical user interface for speech command and control lags behind.

Originally, speech application developers accomplished speech navigation by associating a discrete number of commands available in a graphical user interface with command and control macros. In turn, speech application developers assigned to each command and control macro a corresponding speech command. Thus, a speech navigation system user's utterance invoked a particular command and control macro associated with a command in the graphical user interface. Still, the command specific nature of the speech user interface inhibited its generic application to customized graphical user interfaces. Notably a graphical user interface could include interface objects capable of performing at least one action, for example a button or a list box. Unless the speech developer was aware of each control in a graphical user interface, those controls unknown to the speech developer remained separate from the speech navigation system. Hence, past speech navigation systems lacked portability.

Recently, speech recognition systems have integrated speech navigation, at least as applied to standard graphical user interface controls. Using an accessibility interface, for instance Microsoft® Active Accessibility®, speech developers can provide a more seamless interface between the speech navigation system and the graphical user interface. By way of example, Active Accessibility® can supply a speech navigation system with a wide variety of information concerning controls such as toolbars, buttons and menus in a program's graphical user interface. Using an accessibility interface, speech developers can dynamically assign speech commands to individual controls according to information provided to the speech navigation system by the accessibility interface. In consequence, when a user invokes a window containing a set of controls, the speech navigation system, using the accessibility interface, can query the window for its contents identifying each control. Subsequently, the speech navigation system can assign corresponding standard speech commands according to the identity of each control.

Still, present speech navigation systems cannot properly supply an appropriate speech command for labeless controls not recognized by an accessibility interface. Specifically, present speech navigation systems cannot properly supply an appropriate speech command for controls not having an inherent label. As a result, in a window containing labeless controls in addition to standard controls, the accessibility interface can report only the identity of the standard controls. The speech navigation system will remain ineffective as to each labeless control. Thus, present systems do not provide a complete integration between the speech navigation system and the graphical user interface.

SUMMARY OF THE INVENTION

A system for extending the range of speech commands to labeless controls in an existing graphical user interface in accordance with the inventive arrangement satisfies the long-felt need of the prior art by providing a complete integration between the speech navigation system and the graphical user interface. Thus, the inventive arrangements provide a method and system for speech enabling labeless controls in an existing graphical user interface. The inventive arrangements have advantages over all known speech enabling methods used to speech enable graphical user interface controls, and provides a novel and nonobvious system, including apparatus and method, for speech enabling labeless controls in an existing graphical user interface.

A method for speech enabling labeless controls in an existing graphical user interface can comprise the steps of: identifying controls in a window contained in the graphical user interface; testing each identified control for an associated label; for each identified control having an associated label, adding the associated label to an active grammar of a speech recognition system; for each identified control not having an associated label, creating a label based upon object properties of contextual relevant user interface objects, for instance those object positioned proximate to the identified control; and, further adding each created label to the active grammar. In testing each identified control for an associated label, an accessibility interface query can be applied to each identified control in the window. In addition, in creating the label, each contextually relevant object can be searched for an object property descriptive of the identified control not having an associated label. Subsequently, a label can be formed based upon the descriptive object property found in the searching step.

A method for speech enabling labeless controls in an existing graphical user interface can further comprise the steps of: for each identified control not having a created label based upon an object property of contextually relevant object found in the searching step, determining whether the identified control has a default action; assigning a generic label to the identified control having a default action; associating the determined default action with the assigned label; and, adding the assigned label corresponding to the default action to the active grammar. Additionally, for each identified control having multiple actions with no clear default action, the method can further include the steps of forming a help panel with information about speech commands accessible for that identified control; and, assigning the help panel as the default action.

BRIEF DESCRIPTION OF THE DRAWINGS

There are presently shown in the drawings embodiments which are presently preferred, it being understood, however, that the invention is not limited to the precise arrangements and instrumentalities shown.

DETAILED DESCRIPTION OF THE INVENTION

Figure 1:
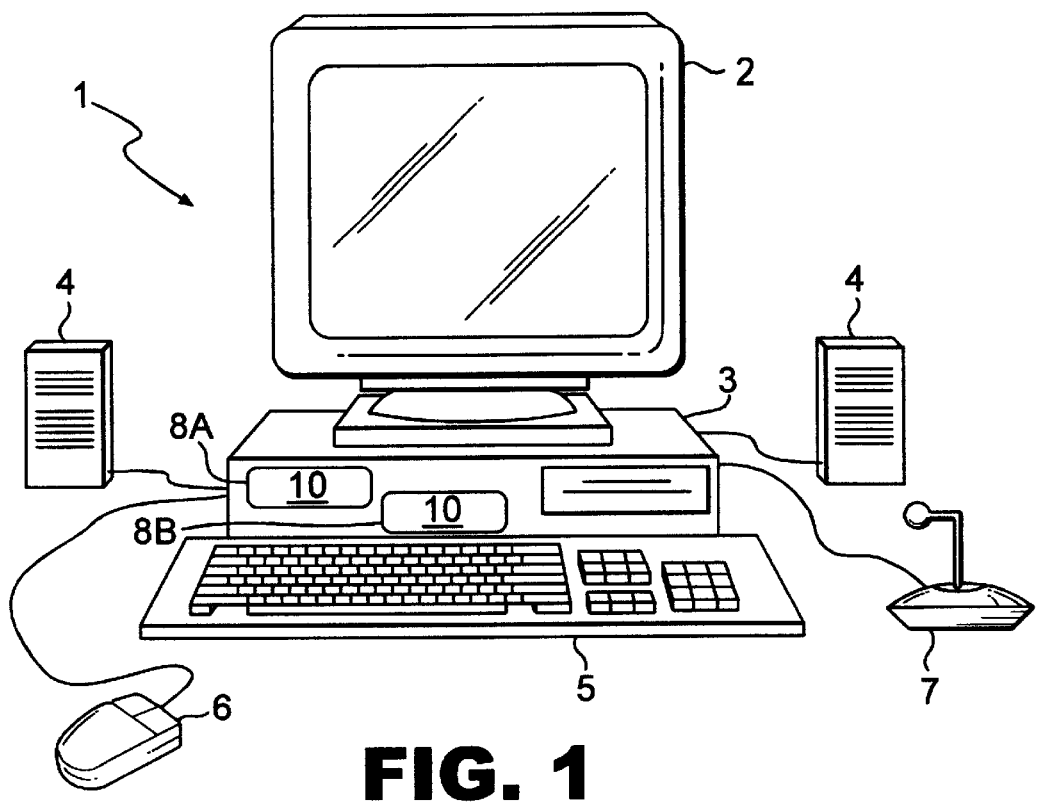
FIG. 1 is a pictorial representation of a computer system with audio capabilities on which the method of the invention can be used.

FIG. 1 shows a typical computer system 1 for use in conjunction with the present invention. The system preferably comprises a computer 3 including a central processing unit (CPU), fixed disk 8A, and internal memory device 8B. The system also includes a microphone 7 operatively connected to the computer system through suitable interface circuitry or "sound board" (not shown), a keyboard 5, and at least one user interface display unit 2 such as a video data terminal (VDT) operatively connected thereto. The CPU can comprise any suitable microprocessor or other electronic processing unit, as is well known to those skilled in the art. An example of such a CPU would include the Pentium or Pentium II brand microprocessor available from Intel Corporation, or any similar microprocessor. Speakers 4, as well as an interface device, such as mouse 6, can also be provided with the system, but are not necessary for operation of the invention as described herein. The various hardware requirements for the computer system as described herein can generally be satisfied by any one of many commercially available high speed multimedia personal computers offered by manufacturers such as International Business Machines (IBM), Compaq, Hewlett Packard, or Apple Computers.

Figure 2:
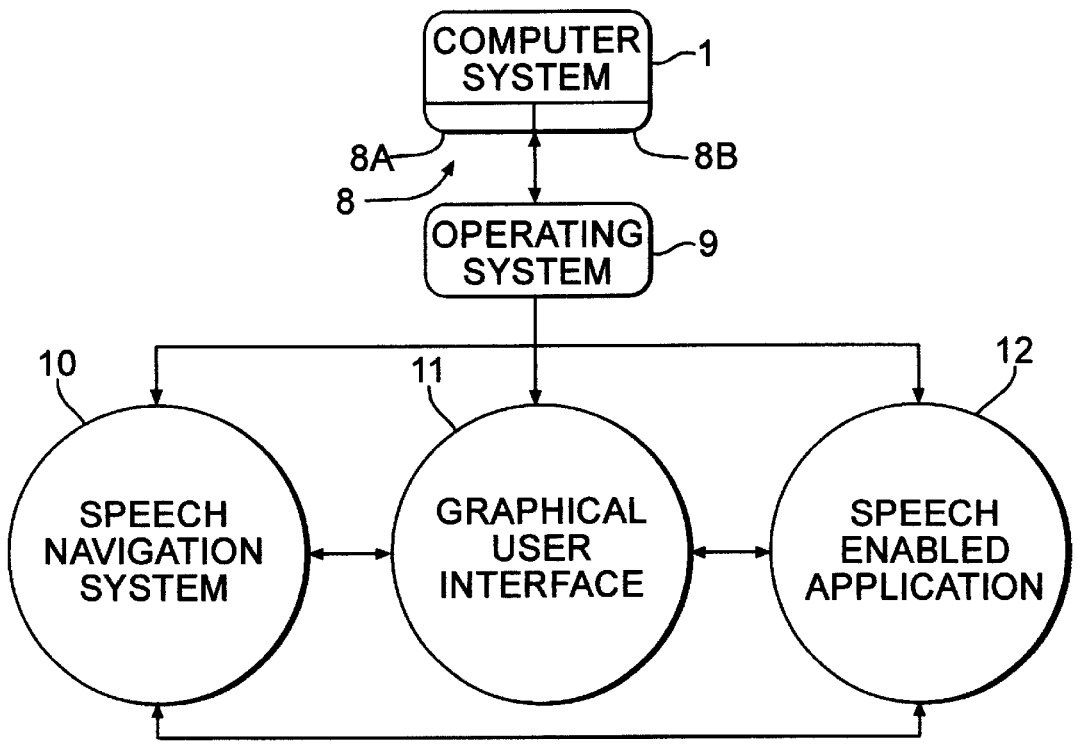
FIG. 2 is a block diagram showing a typical high level architecture for the computer system in FIG. 1.

FIG. 2 illustrates a presently preferred architecture for a speech navigation system in computer 1. As shown in FIG. 2, the system can include an operating system 9, a speech navigation system 10 in accordance with the inventive arrangements, and a graphical user interface 11. A speech enabled application 12 can also be provided. In FIG. 2, the speech navigation system 10, the graphical user interface 11, and the speech enabled application 12 are shown as separate application programs. It should be noted, however, that the invention is not limited in this regard, and these various applications could, of course, be implemented as a single, more complex applications program.

As shown in FIG. 2, computer system 1 includes one or more computer memory devices 8, preferably an electronic random access memory 8B and a bulk data storage medium, such as a fixed disk drive 8A. In a presently preferred embodiment described herein, operating system 9 is one of the Windows family of operating systems, such as Windows NT, Windows 95 or Windows 98 which are available from Microsoft Corporation of Redmond, Wash. However, the system is not limited in this regard, and the invention can also be used with any other type of computer operating system. The system as disclosed herein can be implemented by a programmer, using commercially available development tools for the operating systems described above.

In the present invention, audio signals representative of sound received in microphone 7 are processed within computer 1 using conventional computer audio circuitry so as to be made available to operating system 9 in digitized form. The audio signals received by the computer 1 are conventionally provided to the speech navigation system 10 via the computer operating system 9 in order to perform speech recognition functions. As in conventional speech recognition systems, the audio signals are processed by the speech navigation system 10 to identify speech commands spoken by a user into microphone 7. Recognized speech commands subsequently can be converted to corresponding system commands in the graphical user interface 11 associated with the speech enabled application 12.

Figure 3A:
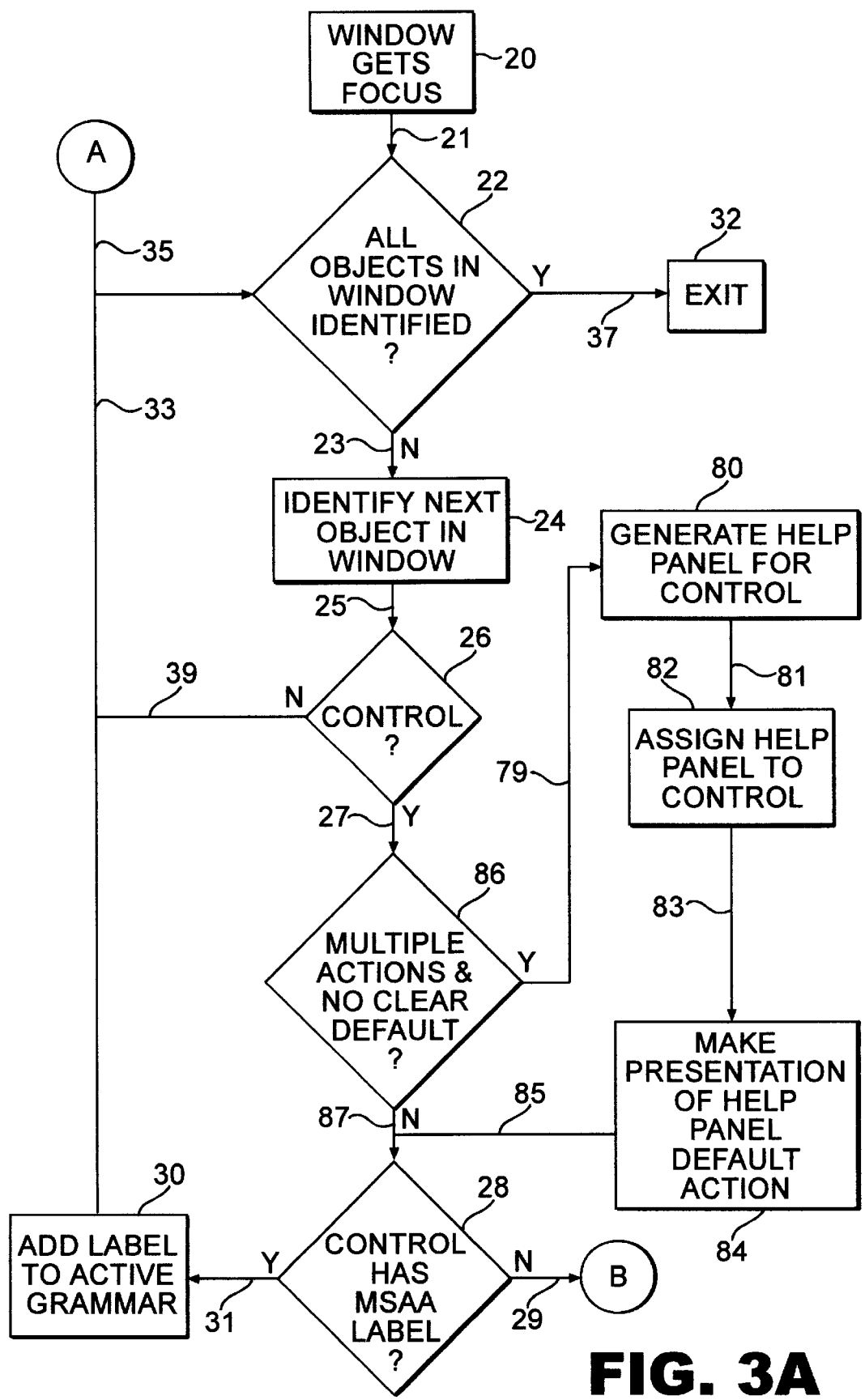
FIGS. 3A–3C, taken together, are a flow chart illustrating the inventive method.
Figure 3B:
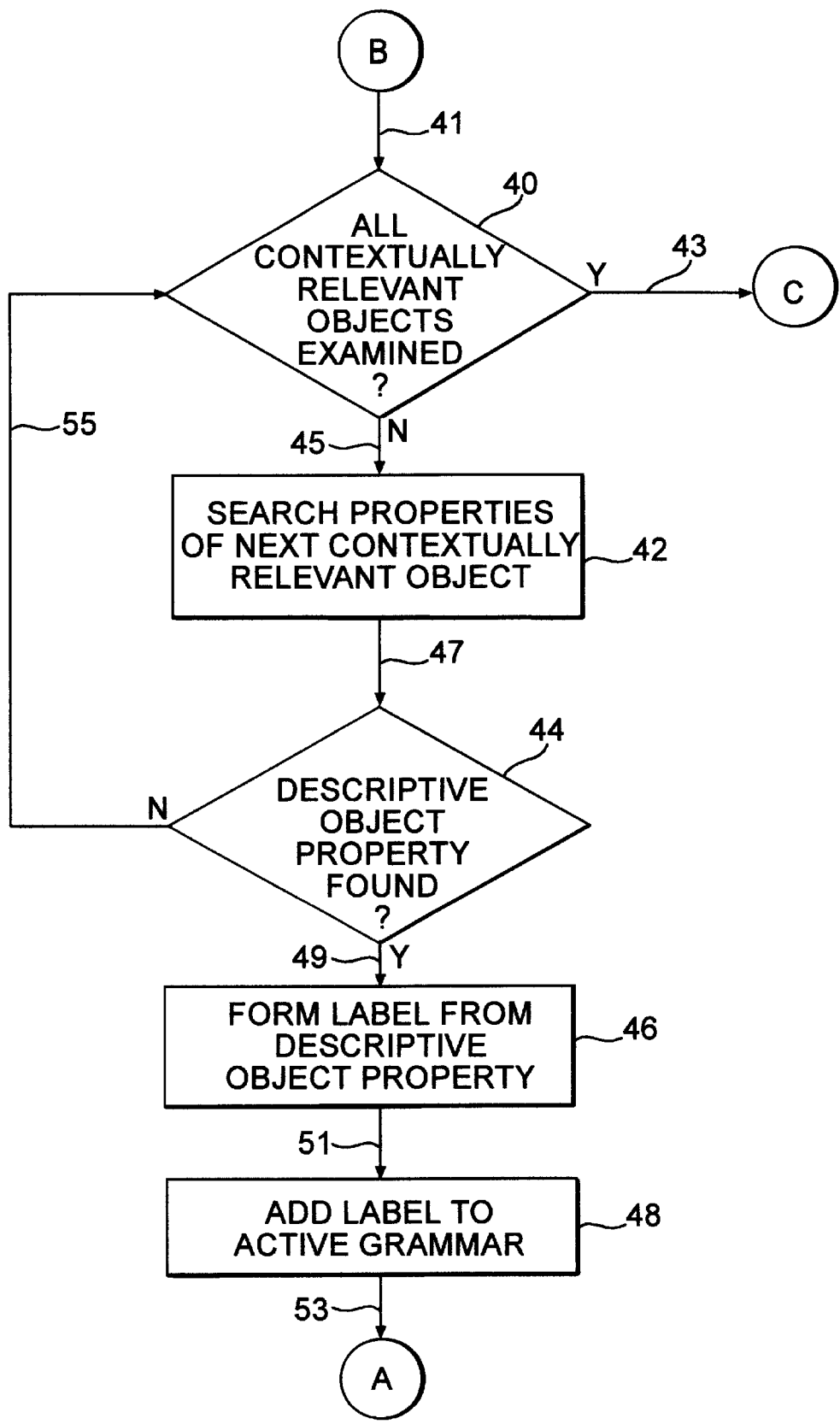
Figure 3C:
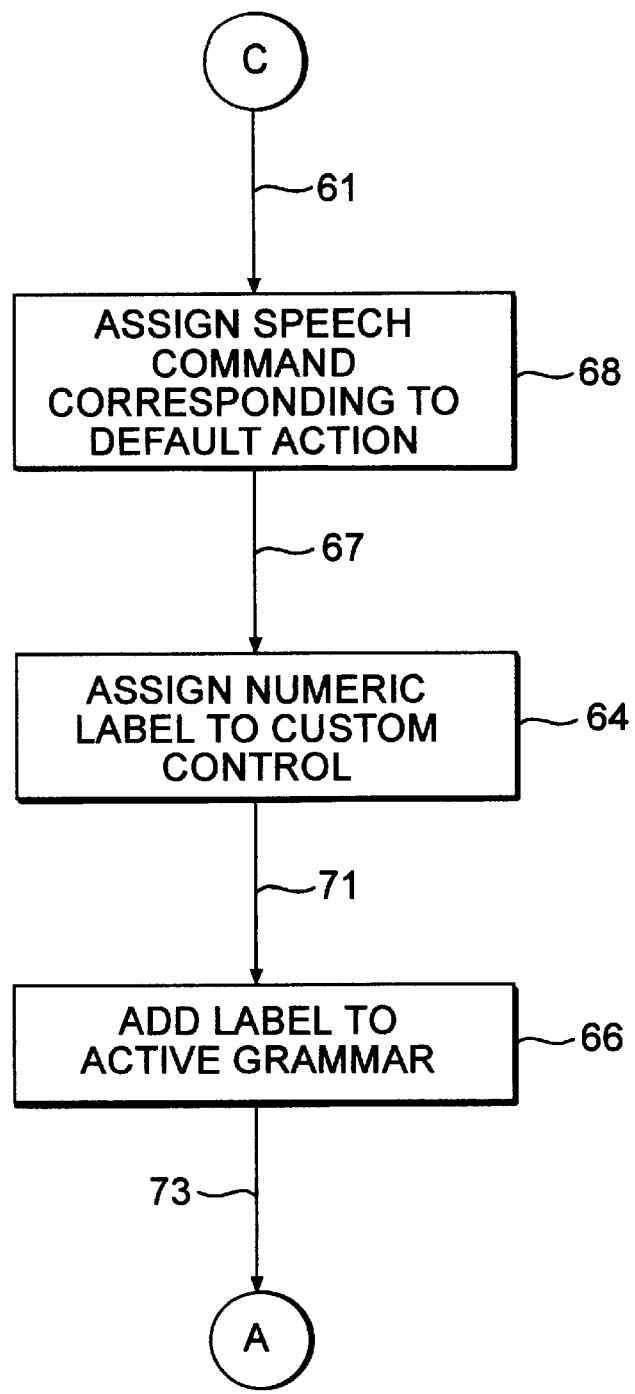

FIGS. 3A–3C, taken together, are a flow chart illustrating a process for speech enabling labeless controls in an existing graphical user interface. In FIG. 3A, the method in accordance with the inventive arrangements begins in block 20 upon a window becoming the exclusive active window in the foreground of the graphical user interface 12, commonly referred to as obtaining focus. Following path 21 to decision block 22, the process continues only if unidentified objects remain in the active window. Continuing along path 23 to block 24, the next unidentified object in the window is identified and, in block 26, tested to determine if the object is a control suitable for speech navigation. If the object is determined not to be a control, returning along paths 39 and 33 to decision block 22, the process can repeat, if necessary.

If, in block 26, the object is determined to be a control, following path 27 to decision block 86, it is further determined whether the control has multiple actions and no clear default action. If the control is determined to have a single action, or a clear default action in decision block 86, the method continues along path 87 to decision block 28. Alternatively, if the control has multiple actions and no clear default action, following path 79 to block 80, a help panel can be formed to include information pertaining to the standard speech commands available for use with the particular class of controls corresponding to the subject control. For instance, the help panel for a list-box type control could include "Scroll Up", "Scroll-Down", or "Enter-Key". Moreover, following path 81 to block 82, the newly formed help panel can be assigned to the subject control. Finally, the presentation of the help panel is assigned to the control as the default action in block 84. In this way, the user can be informed of possible speech commands consistent with the subject control.

Continuing along path 85 to decision block 28, the control can be queried for a corresponding label. Specifically, each control can be queried through the use of an accessibility interface provided by Microsoft® Active Accessibility®. Active Accessibility® is based on the Component Object Model (COM), the Microsoft®-developed industry standard that defines a common way for applications and operating systems to communicate. In an Active Accessibility® application, sometimes referred to as a server, the server can provide information about the contents of the computer screen that is within the server's control. Accessibility aids, referred to as clients, use Active Accessibility® to obtain information about the user interface of other applications and the operating system. With Active Accessibility®, user interface elements are exposed to clients as COM objects. These accessible objects maintain pieces of information, called properties, which describe the object's name, screen location, and other information needed by accessibility aids. Accessible objects also provide methods, which are functions that clients can call to cause the object to perform some action. Accessible objects are implemented using Active Accessibility®'s COM-based IAccessible interface. This interface includes functions such as IAccessible::get_accName and IAccessible::accLocation, which allow clients to examine an object's properties. The interface also provides methods such as IAccessible::accDoDefaultAction and IAccessible::accHitTest, which clients can call to cause the object to perform some action. Clients obtain information about or interact with an object by calling the IAccessible properties and methods.

Thus, in decision block 28, a control identified in decision block 26 can be queried for a corresponding label using IAccessible::get_accName. If the Active Accessibility® interface returns a label, following path 31 to block 30, the label can be added to the active grammar of the speech navigation system. Returning along path 33 to decision block 22, the next object can be tested unless no more unidentified objects remain in the active window. Accordingly, following path 37 to block 32, the process terminates.

In contrast, if in decision block 28 the Active Accessibility® interface fails to return a label, following path 29 to jump circle B, contextually relevant user interface objects, for instance objects proximate to the labeless control, can be examined for object properties pertinent to the identity of the labeless control. Specifically, in FIG. 3B, following path 41 from jump circle B to decision block 40, the process can continue so long as unidentified contextually relevant objects remain. If unidentified contextually relevant objects remain to be inspected, the process continues along path 45 to block 42 in which the object properties of each contextually relevant object are inspected for a potential label. Following path 47 to decision block 44, the next contextually relevant object can be examined if the process fails to uncover a descriptive object property in the present contextually relevant object.

If, however, a descriptive property is found in a contextually relevent object in decision block 44, continuing along path 49 to block 46, a label can be created using the uncovered descriptive object property. Subsequently, following path 51 to block 48, the created label can be added to the active grammar of the speech navigation system before returning along path 53 to jump circle A to decision block 22 in FIG. 3A, whereupon the next window object can be identified and labeled, if necessary. But, if all contextually relevant objects have been identified in decision block 40, yet none provide a descriptive object property useful in the creation of a label for the control, then following path 43 to jump circle C, a default method can provide an appropriate mechanism suitable for speech navigation which can be associated with the subject labeless control as a label substitute.

FIG. 3C illustrates the default method for providing a substitute label for unhandled labeless controls. From jump circle C, leading to block 68 along path 61, a speech command can be associated with the labeless control corresponding to the labeless control's default action. Following path 67 to block 64, a numeric label can be assigned to the labeless control as a label. Finally, following path 71 to block 66, the assigned label is added to the active grammar. Subsequently, the process can return along path 73 to jump circle A to decision block 22 in FIG. 3A, whereupon the next window object can be identified and labeled, if necessary.

Having assigned a label or label substitute to each control and labeless control in the active window, the speech navigation system 10 in coordination with graphical user interface 12 can display each label in or near the controls to which they apply. If labeling obstructs the view of objects in the active window, a symbol, for instance a transparent image of a speech bubble with a line therethrough, or a small red dot, can be positioned proximate to the control. The symbol can indicate to the user that the user must take an affirmative action to display the controls. The affirmative action can be a click of mouse 6, or a tap of a key in keyboard 5. Furthermore, the affirmative action could be the speech command, "Show Me What To Say." Upon receiving the affirmative command, the labels can be displayed until the user either issues a speech command affecting a control in the active window, issues a speech command to hide the labels, or until a reasonable timeout period, for instance one minute, elapses. As an alternative, each label can be drawn transparently over the label's corresponding control so as to not obscure important graphical information.

When the speech navigation system 10 receives a speech command corresponding to a label associated with a control in the active window, the speech navigation system 10 can execute the single function associated with that control. In contrast, where the control associated with the invoked label is more complex and can respond to several speech commands, the help panel containing information about each speech command pertaining to a control aspect of the object can be displayed. In any event, however, each control contained in the active window, including labeless controls, can be manipulated by the speech navigation system 10. Hence, the present inventive method provides a complete integration between the speech navigation system 10 and the graphical user interface 12.

What is claimed is:

1. A method for automatically speech enabling labeless controls within an existing application specific graphical user interface comprising the steps of:

identifying controls in a window contained within said application specific graphical user interface;

testing each identified control for an associated label using an accessibility interface;

for each identified control having an associated label, adding said associated label to an active grammar of a speech recognition system;

for each identified control not having an associated label, creating a label based upon a property of another object within said application specific graphical user interface; and, further adding each created label to said active grammar.

2. The method according to claim 1, wherein said testing step comprises applying an accessibility interface query to each said identified control in said window.

3. The method according to claim 1, wherein said creating step comprises the steps of:

searching each contextually relevant object for an object property descriptive of said identified control not having an associated label; and, forming a label based upon said descriptive object property found in said searching step.

4. The method according to claim 3, further comprising the steps of:

for each identified control not having a created label based upon an object property of a contextually relevant object found in said searching step, determining whether said identified control not having a created label has a default action;

assigning a generic label to said identified control not having a created label;

associating said determined default action with said assigned label; and, adding said assigned label corresponding to said default action to said active grammar.

5. The method according to claim 4, further comprising the steps of:

for each identified control not determined to have a clear default action in said determining step, forming a help panel with information about speech commands accessible for said identified control not having a created label; and, assigning a presentation of said help panel as said default action for said identified control.

6. A computer apparatus programmed with a routine set of instructions stored in a fixed medium for automatically speech enabling labeless controls within an existing application specific graphical user interface, said computer apparatus comprising:

means for identifying controls in a window contained within said application specific graphical user interface;

means for testing each identified control for an associated label using an accessibility interface;

for each identified control having an associated label, means for adding said associated label to an active grammar of a speech navigation system;

for each identified control not having an associated label, means for creating a label based upon a property of another object within said application specific graphical user interface; and, means for further adding each created label to said active grammar of said speech navigation system.

7. The computer apparatus according to claim 6, wherein said testing means comprises means for applying an accessibility interface query to each said identified control in said window.

8. The computer apparatus according to claim 6, wherein said creating means comprises:

means for searching each contextually relevant object for an object property descriptive of said identified control not having an associated label; and, means for forming a label based upon said descriptive object property found by said searching means.

9. The computer apparatus according to claim 8, further comprising:

for each identified control not having a created label based upon an object property of a contextually relevant object found by said searching means, means for determining whether said identified control not having a created label has a default action;

means for assigning a generic label to said identified control not having a created label;

means for associating said determined default action with said assigned label; and, means for adding said assigned label corresponding to said default action to said active grammar.

10. The computer apparatus according to claim 9, further comprising:

for each identified control determined not have an associated single action by said determining means, means for forming a help panel with information about speech commands accessible for said identified control not having a created label; and, means for assigning a presentation of said help panel as said default action for said identified control.

* * * * *